United States Patent
Wyatt et al.

(10) Patent No.: US 7,409,477 B2
(45) Date of Patent: Aug. 5, 2008

(54) MEMORY CARD HAVING A PROCESSOR COUPLED BETWEEN HOST INTERFACE AND SECOND INTERFACE WHEREIN INTERNAL STORAGE CODE PROVIDES A GENERIC INTERFACE BETWEEN HOST INTERFACE AND PROCESSOR

(75) Inventors: Stewart R. Wyatt, Boise, ID (US); Robin Alexis Takasugi, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 449 days.

(21) Appl. No.: 10/654,135

(22) Filed: Sep. 3, 2003

(65) Prior Publication Data
US 2005/0060465 A1 Mar. 17, 2005

(51) Int. Cl.
*G06F 13/12* (2006.01)
*G06F 13/38* (2006.01)
*G06F 13/00* (2006.01)

(52) U.S. Cl. ............................ 710/62; 710/8; 710/10; 710/13; 710/33; 710/38; 710/102; 710/300; 714/7; 711/2; 711/115; 439/159; 439/630

(58) Field of Classification Search ............ 710/8, 710/10, 13, 33, 38, 62, 102, 300; 714/7; 711/2, 115; 439/630, 159
See application file for complete search history.

(56) References Cited

U.S. PATENT DOCUMENTS

| | | | |
|---|---|---|---|
| 5,149,276 A * | 9/1992 | Dixon | 439/159 |
| 6,182,162 B1 | 1/2001 | Estakhri et al. | |
| 6,353,870 B1 | 3/2002 | Mills et al. | |
| 6,385,677 B1 * | 5/2002 | Yao | 711/115 |
| 6,438,638 B1 | 8/2002 | Jones et al. | |
| 6,568,960 B2 * | 5/2003 | Bricaud et al. | 439/630 |
| 6,741,934 B2 * | 5/2004 | Chen et al. | 701/213 |
| 6,776,348 B2 * | 8/2004 | Liu et al. | 235/492 |
| 6,817,531 B2 * | 11/2004 | Taussig et al. | 235/492 |
| 6,842,335 B1 * | 1/2005 | Hanson et al. | 361/683 |
| 6,857,038 B2 * | 2/2005 | Liu et al. | 710/301 |
| 6,980,465 B2 * | 12/2005 | Taussig et al. | 365/158 |
| 6,984,152 B2 * | 1/2006 | Mowery et al. | 439/638 |
| 6,993,601 B2 * | 1/2006 | Minami et al. | 710/38 |
| 2004/0030820 A1 * | 2/2004 | Lan | 710/300 |
| 2004/0180692 A1 * | 9/2004 | Yang et al. | 455/557 |
| 2005/0078195 A1 * | 4/2005 | VanWagner | 348/231.3 |
| 2005/0268162 A1 * | 12/2005 | Milligan et al. | 714/7 |

FOREIGN PATENT DOCUMENTS

| EP | 1049325 | * 11/2000 |
|---|---|---|
| JP | 05062455 | * 12/1993 |

* cited by examiner

*Primary Examiner*—Tammara R Peyton

(57) ABSTRACT

A memory card comprising a first modular component that comprises a first interface and first conductors and a data mover that comprises second conductors coupled to the first conductors. The first modular component is replaceable with a second modular component that comprises a second interface that differs from the first interface and third conductors that are configured to couple to the second conductors.

12 Claims, 10 Drawing Sheets

MEMORY CARD HAVING A PROCESSOR COUPLED BETWEEN HOST INTERFACE AND SECOND INTERFACE WHEREIN INTERNAL STORAGE CODE PROVIDES A GENERIC INTERFACE BETWEEN HOST INTERFACE AND PROCESSOR

CROSS REFERENCE TO RELATED APPLICATIONS

This patent application is related to Non-Provisional U.S. patent application Ser. No. 10/653,756, entitled "MEMORY CARD WITW A MODULAR COMPONENT" flied on even date herewith, assigned to the assignee of the present invention, and incorponited brain by reference.

BACKGROUND OF THE INVENTION

The need for portability and ease in capturing and saving information from various locations away from a user's office or work has resulted in a proliferation of portable electronic devices, such as digital cameras, personal digital assistants, and notebook computers. With the proliferation of portable electronic devices, the use of form factor cards adapted for use with these devices is steadily increasing as well, and the uncertainty of the portable electronic device market has also spilled over to the form factor card market.

The uncertainty of the form factor card market has resulted in several form factor card standards jockeying to become the dominant standard. The term "form factor card" is a general term often used to describe a memory card employing a variety of different standards, such as a SONY Memory Stick or Compact Flash card, but also applies to cards that perform other functions, including I/O cards such as serial cards, Ethernet cards, fax/modem cards, wireless pagers, and multimedia cards. Unfortunately, since none of the existing or emerging card standards are able to meet 100% of customer needs, a dominant standard has not emerged and is unlikely to emerge in the foreseeable future.

Consequently, a memory card manufacturer is forced to supply separate memory cards that accommodate the myriad of existing and emerging memory card technologies. If a memory card manufacturer wants to compete in the market, the memory card manufacturer must take into account all of the different memory card standards, which include both device interface standards and storage technology standards. For example, if there are N interfaces in the market and M different storage technologies, then the memory card manufacturer may design N times M memory cards employing different control systems to offer a full portfolio of memory cards and compete in the memory card market. This results in significant delays and could require many months to specify, design, verify, fabricate, and test the memory card before it may be brought to market. For example, a typical design period may encompass 18 months.

A need exists for a manufacturer to be able to leverage the development of memory cards by allowing the most efficient use of resources and accelerating time to market without increasing the cost of producing a memory card. The present invention may address this and other issues.

SUMMARY OF THE INVENTION

One exemplary embodiment of the present disclosure provides a memory card comprising a first modular component that comprises a first interface and first conductors and a data mover that comprises second conductors coupled to the first conductors. The first modular component is replaceable with a second modular component that comprises a second interface that differs from the first interface and third conductors that are configured to couple to the second conductors.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

Figure 1:
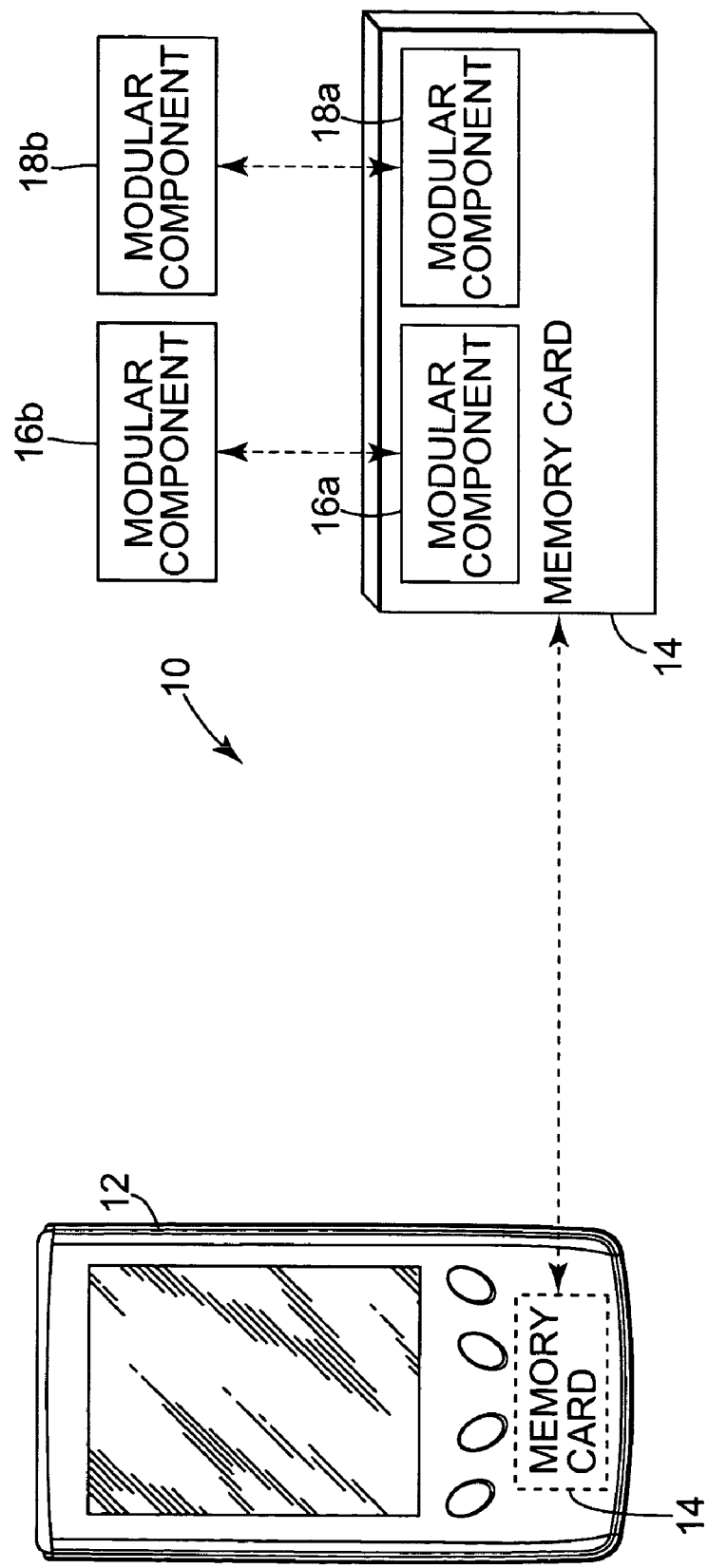
FIG. 1 is a diagram illustrating an embodiment of a computing system.

FIG. 1 is a diagram illustrating an embodiment of a computing system 10. Computing system 10 includes a host electronic device 12 and a memory, which is preferably a removable memory card 14 that plugs in to computing system 10. Memory card 14 includes modular components 16a and 18a.

Host device 12 communicates with memory card 14 to read information from and write information to memory card 14. Host device 12 may be any device that utilizes memory card 14. For example, host device 12 may be a digital camera, an MP3 player, a digital camcorder, a personal digital assistant, a laptop, a notebook computer, or another computing device. In one embodiment, host device 12 is a personal digital assistant or "PDA".

Each modular component 16a and 18a is configured according to one or more interface standards. The interface standards include host-to-memory card interface standards such as CompactFlash as set forth by the CompactFlash Specification Version 2.0 and any prior or subsequent versions, Secure Digital as set forth by the SD Memory Card Specifications Version 1.01 and any prior or subsequent versions, PCMCIA as set forth by the PC Card Standard 8.0 and any prior or subsequent versions, and Memory Stick according to specifications implemented by Sony Electronics Corporation, and data storage device interface standards such as interfaces to magnetic random access memory (MRAM), flash memory, and other solid state or rotating media memory such as microdrives.

The CompactFlash Specification Version 2.0 may be available from the CompactFlash Association, P.O. Box 51537, Palo Alto, Calif. 94303. The SD Memory Card Specifications Version 1.01 may be available from the SD Card Association, 719 San Benito Street, Suite C, Hollister, Calif. 95023. The PC Card Standard 8.0 is available from PCMCIA, 2635 North First Street, Suite 209, San Jose, Calif. 95134. Memory Stick specifications may be available from Sony Electronics Corporation.

The interface specifications define the mechanical, electrical, and/or protocol attributes of an interface between two or more components. Modular components 16a and 18a are each configured such that they are replaceable by another modular component 16b and 18b, respectively. Modular components 16b and 18b may be configured according to different interface standards than modular components 16a and 16b, respectively.

Figure 2:
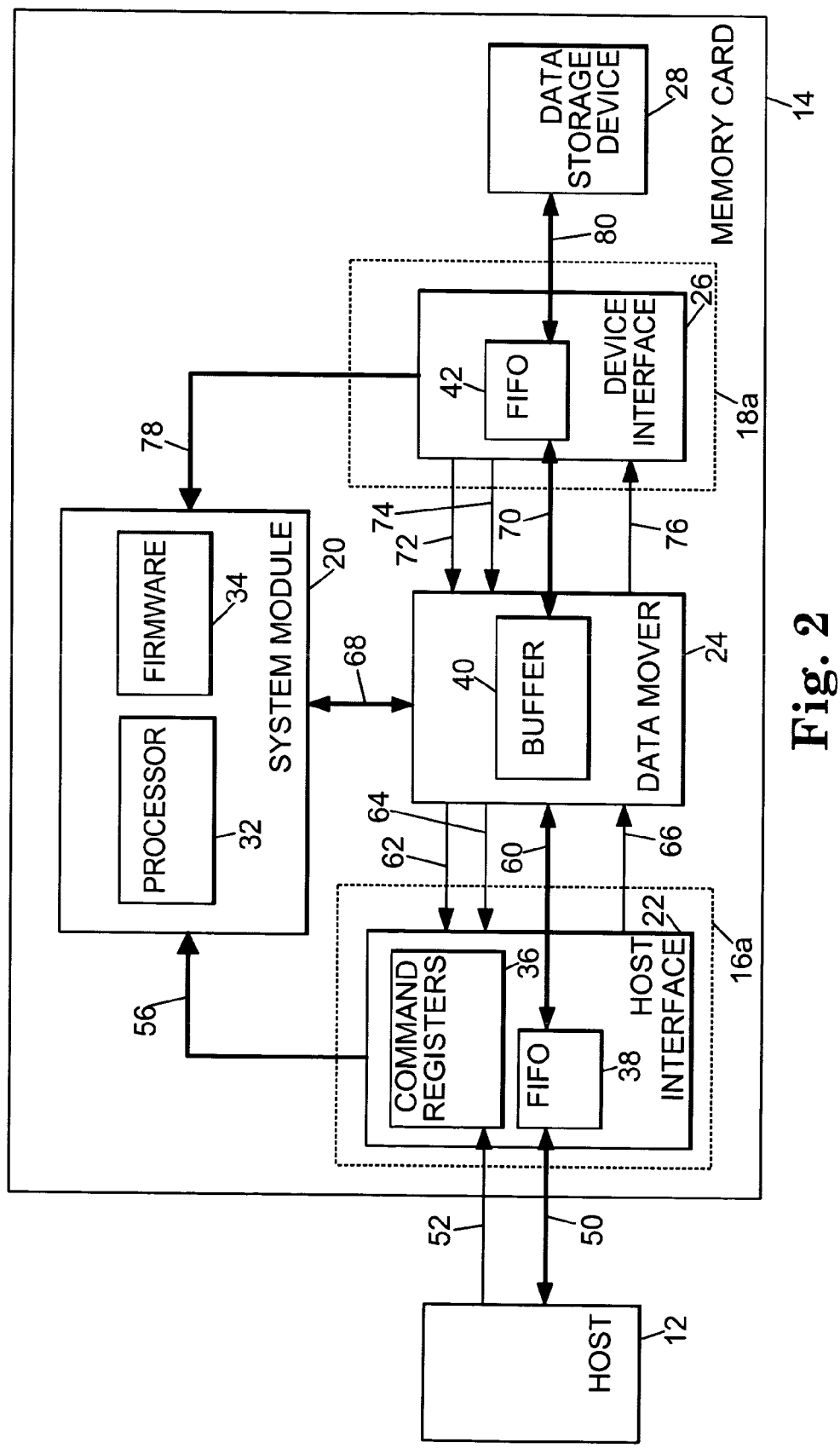
FIG. 2 is a block diagram illustrating an embodiment of a data storage system with modular components.

FIG. 2 is a block diagram illustrating an embodiment of a memory card 14 in communication with host device 12. Memory card 14 includes a system module 20, a host interface 22, a data mover 24, a device interface 26, and a data storage device 28. System module 20 includes a processor 32 and firmware 34. Processor 32 is configured to execute instructions in firmware 34. Host interface 22 includes command registers 36 and a first-in-first-out buffer (FIFO) 38. Data mover 24 includes a buffer 40. Device interface 26 includes a FIFO 42.

Host 12 is configured to provide information to and receive information from host interface 22 using signal conductors 50. Host 12 provides commands to command registers 36 in host interface 22 of memory card 14 using signal conductors 52.

In response to commands from host 12, host interface 22 generates interrupts and provides the interrupts to system module 20 using signal conductors 56. System module 20 is configured to receive interrupts from host interface 22 and process the interrupts using processor 32 and firmware 34. In response to interrupts associated with data transfer commands such as read and write commands, system module 20 provides information associated with the commands to data mover 24 using signal conductors 68 to cause host interface 22, data mover 24, device interface 26, and data storage device 28 to perform functions associated with the command.

Information received from host 12 by host interface 22 is stored in FIFO 38. Commands received from host 12 are stored in one or more command registers 36 in host interface 22. Host 12 also accesses status information from host interface 22. Information is transferred between host interface 22 and data mover 24 using signal conductors 60. Host interface 22 is configured to receive a transfer block signal and a last-in-transfer signal from data mover 24 using signal conductors 62 and 64, respectively. Host interface 22 is configured to generate a block transferred signal and provide the block transferred signal to data mover 24 using a signal conductor 66.

Information received from host interface 22 by data mover 24 is stored in buffer 40. Data mover 24 is configured to generate the transfer block signal and the last-in-transfer signal and provide these signals to host interface 22 using conductors 62 and 64. Data mover 24 is configured to receive information from and provide information to system module 20 using conductors 68.

Information is transferred between data mover 24 and device interface 26 using signals 70. Data mover 24 is configured to receive a sector transferred signal and an error signal from device interface 26 using signal conductors 72 and 74, respectively. Data mover 24 is configured to generate a transfer sector signal and provide the transfer sector signal to device interface 26 using a signal conductor 76.

Information received from data mover 24 by device interface 26 is stored in FIFO 42. Device interface 26 is configured to generate the sector transferred signal and the error signal and provide these signals to data mover 24 using conductors 72 and 74. Device interface 26 is configured to receive the transfer sector signal from data mover 24 using conductor 76.

Information is transferred between device interface 26 and data storage device 28 using signals 80. Additional signal conductors not shown in FIG. 2 may be employed by host device 12, system module 20, host interface 22, data mover 24, device interface 26, and/or data storage device 28.

Modular component 16a includes host interface 22 as well as a set of conductors coupled to signal conductors 50, 52, 56, 60, 62, 64, and 66. Modular component 18a includes device interface 26 as well as a set of conductors coupled to signal conductors 70, 72, 74, 76, 78, and 80.

Data storage device 28 comprises a non-volatile memory. Non-volatile memories include flash memory, magnetic random access memory (MRAM), and other persistent storage devices such as a micro disk drive.

In the embodiment of FIG. 2, modular component 16a is configured to implement a first type of interface between host device 12 and memory card 14, and modular component 18a is configured to implement an interface to a first type of data storage device 22, e.g. an MRAM storage device. The discrete and generic nature of the signaling interfaces in system module 20, host interface 22, data mover 24, and device interface 26 allow modular components 16a and 18a to be replaced with modular components 16b and 18b, respectively, which implement other types of interfaces.

In particular, host interface 22 of modular component 16a may be replaced with a second type of host interface (not shown) in modular component 16b that implements a different type of interface between host device 12 and memory card 14. Modular component 16b provides the same signaling interface, i.e. the same physical connections, to system module 20 and data mover 24 as modular component 16a. In addition, modular component 16b conforms to the same signaling protocol with system module 20 and data mover 24 as modular component 16a.

Similarly, device interface 26 of modular component 18a may be replaced with a second type of device interface (not shown) in modular component 18b that implements an interface to a second type of data storage device 28, e.g. flash memory. Modular component 18b provides the same signaling interface, i.e. the same physical connections, to system module 20 and data mover 24 as modular component 18a. In addition, modular component 18b conforms to the same signaling protocol with system module 20 and data mover 24 as modular component 18a.

Host interface 22 effectively hides the details of the type of host from system module 20 and data mover 24 by providing a generic interface to system module 20 and data mover 24. Similarly, device interface 26 effectively hides the details of the type of storage medium from system module 20 and data mover 24 by providing a generic interface to system module 20 and data mover 24.

System module 20 manages the transfer of information between host device 12 and data storage device 28. Host device 12 communicates with memory card 14 by providing commands to host interface 22. In response to being notified that a command has been received, system module firmware 34 initializes host interface 22, data mover 24, and device interface 26 and initiates the execution of the command by providing a signal to data mover 24. In addition, system module 20 generates status information and provides the status information to host interface module 22. System module 20 generates status information in response to interrupts from host interface 22, data mover 24 and device interface 26. The interrupts from host interface 22, data mover 24 and device interface 26 may be generated in response to errors. Further, system module 20 performs diagnostic, power management, and clock control functions.

Host interface 22 operates according to a host interface protocol to communicate with host device 12. Host interface 22 interface protocols include CompactFlash, Secure Digital, Memory Stick, and other suitable host interface protocols.

In one embodiment, host interface 22 comprises a CompactFlash interface meeting the CF+ and CompactFlash Specification Version 2.0 of the CompactFlash Association. The CF+ and CompactFlash Specification Version 2.0 are incorporated by reference herein. In this embodiment, host interface 22 initiates data transfers, operates in supported CompactFlash modes (e.g., PC card memory, PC Card I/O and true IDE), maintains contents of a Card Information Structure (CIS) RAM, manages configuration parameters, and receives and executes CompactFlash ATA commands.

In one embodiment, read and write commands from host 12 are based on logical block addressing. Device interface module 26 may perform error detection and correction using an error correction code (ECC) (not shown) and may implement sparing algorithms (not shown) to improve the storage efficiency of data storage device 28. In one embodiment, device interface 26 checks all sectors in data storage device 28 using a spare lookup module (not shown) to see if information requested by host device 12 has been relocated on data storage device 28. In one aspect, device interface 26 uses sparing tables to look up a logical block address included in the operation request and determine a physical sector address of any sector of data storage device 28.

Data mover 24 controls the rate of information transfer between host interface 22 and device interface 26. In particular, data mover 24 adjusts the transfer rate as needed to allow different types of host interfaces 22 and data interfaces 26 to communicate using buffer 40 regardless of any speed differences between a particular host interface 22 and a particular device interface 26.

The operation of components of memory card 14 will now be described with reference to FIGS. 3, 4a, 4b, 5a, 5b, 6a, and 6b.

Figure 3:
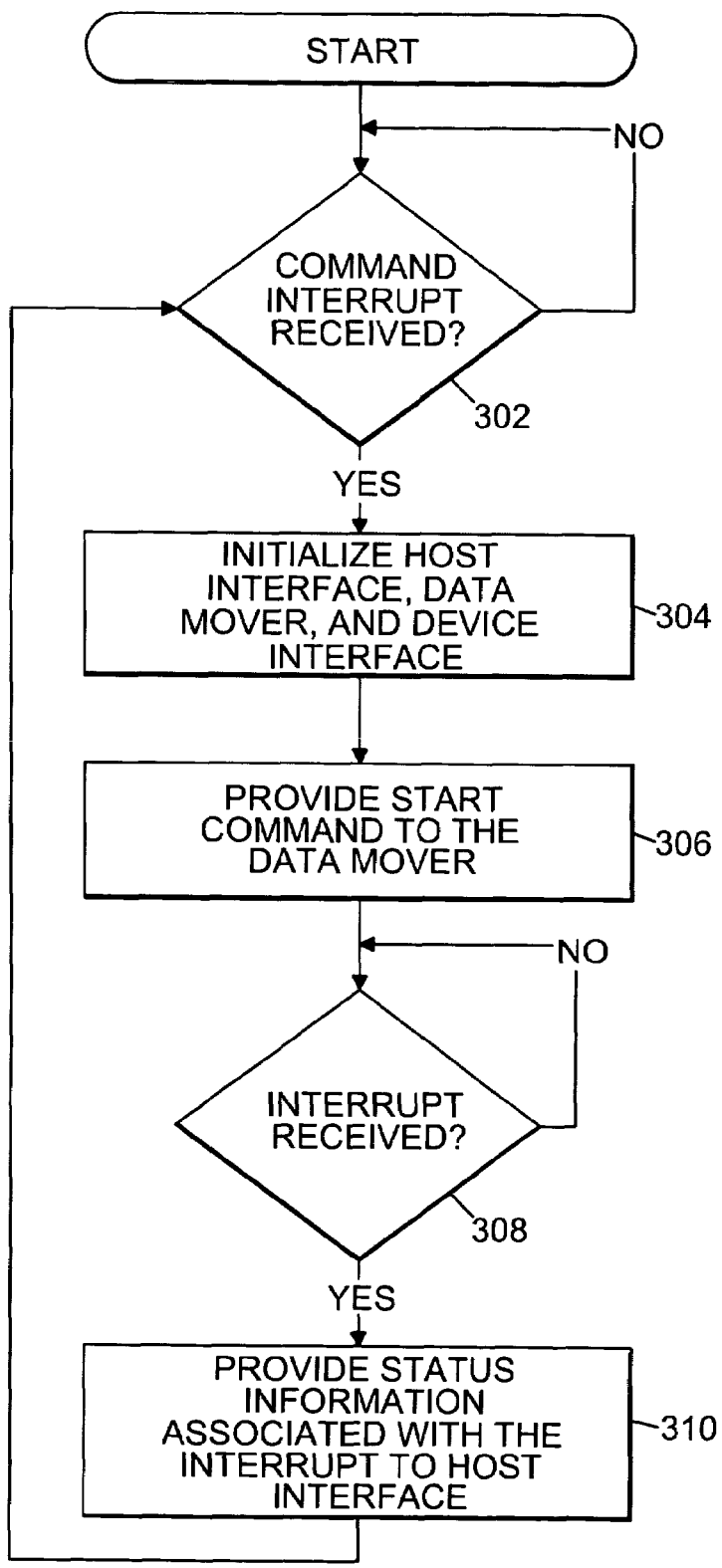
FIG. 3 is a flow chart illustrating an embodiment of a method performed by a system module.

FIG. 3 is a flow chart illustrating an embodiment of a method performed by system module 20. In FIG. 3, a determination is made by system module 20 as to whether a command interrupt has been received on a conductor 56 as indicated in block 302. A command interrupt refers to an interrupt associated with a command received by host interface 22 from host 12. If a command interrupt has not been received, then function of block 302 is repeated at a later time.

If a command interrupt has been received, then system module 20 initializes host interface 22, data mover 24, and device interface 26 as indicated in block 304. System module 20 provides a start command to data mover 24 using conductors 68 as indicated in block 306. The start command causes the performance of the command (e.g., a read or write command) received by memory card 14 from host 12 to be initiated.

A determination is made by system module 20 as to whether an interrupt has been received as indicated in block 308. If an interrupt has not been received, then the function of block 308 is repeated at a later time. The interrupt may be a command complete interrupt from device interface 26 or an error interrupt from host interface 22, data mover 24, or device interface 26. System module 20 generates status information associated with the interrupt and provides the status information to host interface 22 as indicated in block 310. Host device 12 accesses the status information to determine that either a command has completed successfully or an error has occurred. The method repeats beginning with the function shown in block 302.

Figure 4A:
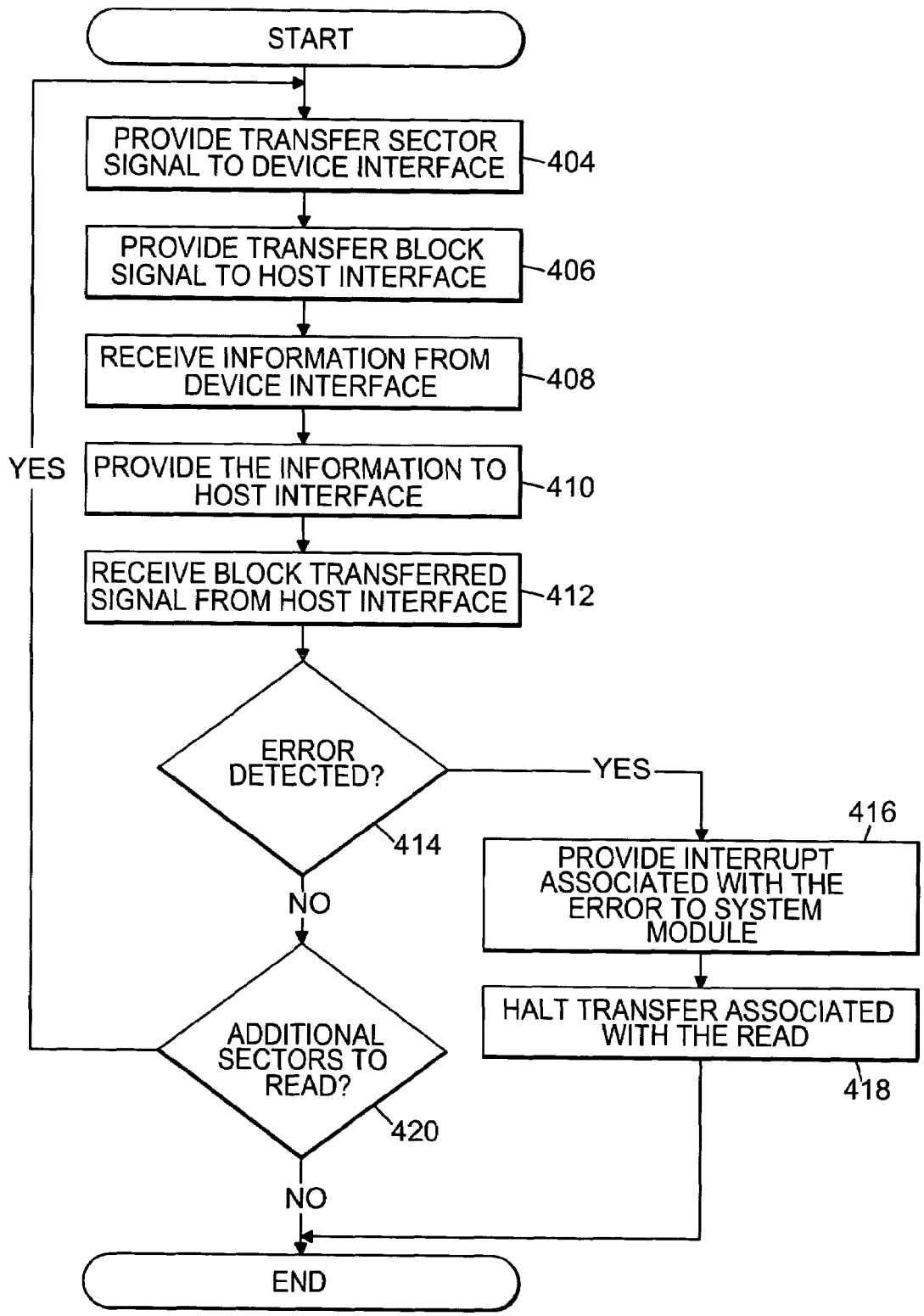
FIG. 4a is a flow chart illustrating an embodiment of a first method performed by a data mover.
Figure 4B:
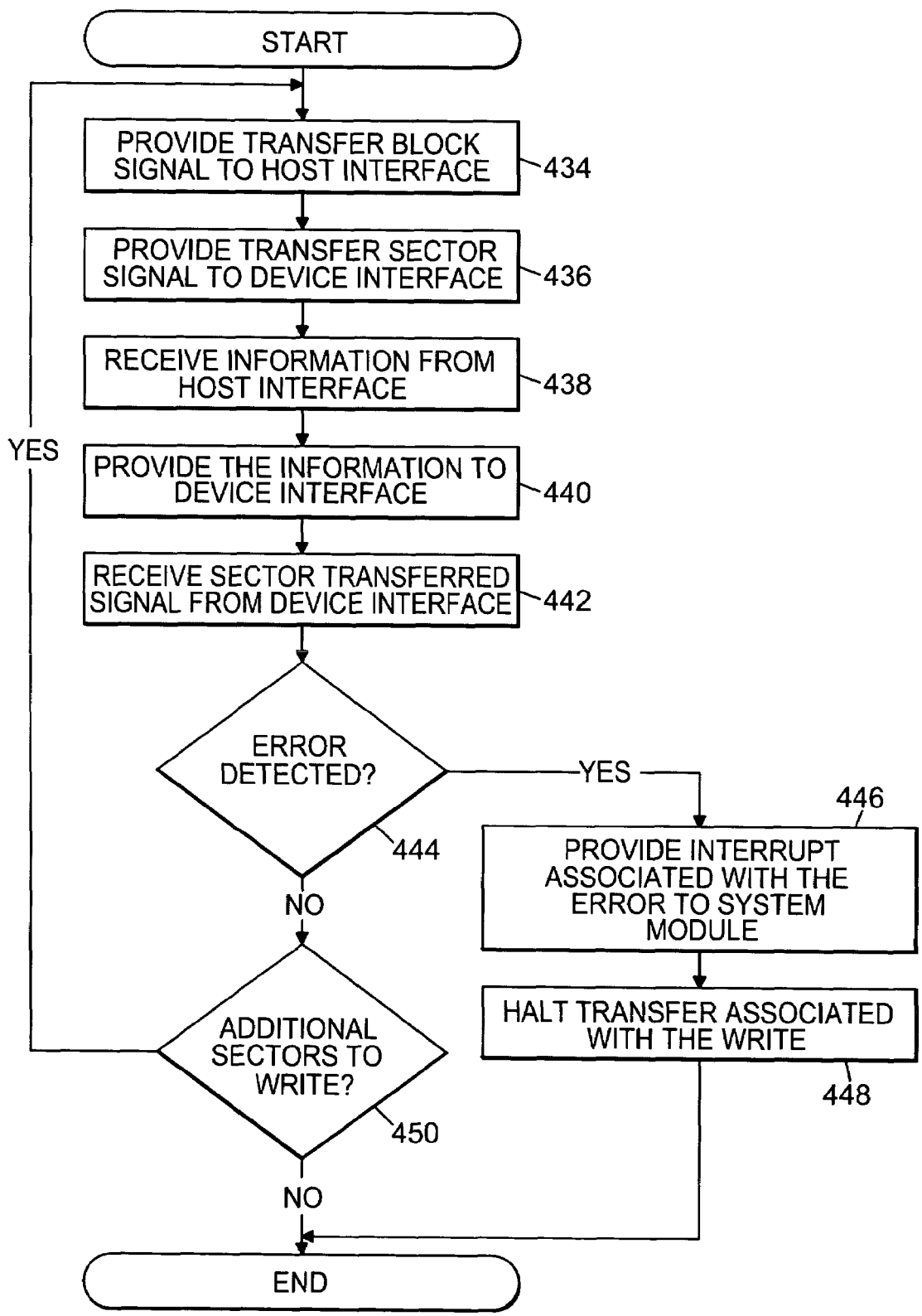
FIG. 4b is a flow chart illustrating an embodiment of a second method performed by a data mover.

FIGS. 4a and 4b are flow charts illustrating embodiments of methods performed by data mover 24 in response to read commands and write commands, respectively.

In FIG. 4a, data mover 24 provides the transfer sector signal to device interface 26 using conductor 76 as indicated from block 404. The transfer sector signal causes one or more sectors to be read from data storage device 28 and provided to data mover 24. Data mover 24 provides the transfer block signal to host interface 22 using conductor 62 as indicated in block 406. The transfer block signal instructs host interface 22 to begin transferring information associated with the read command.

Data mover 24 receives information associated with the read command from device interface 26 on conductors 70 as indicated in block 408. Data mover 24 provides the information to host interface 22 using conductors 60 as indicated in block 410. Data mover 24 receives the block transferred signal from host interface 22 on conductor 66 as indicated in block 412.

A determination is made by data mover 24 as to whether an error has been detected as indicated in block 414. If an error has been detected, then data mover 24 generates an interrupt associated with the error and provides the interrupt to system module 20 using a conductor 68 as indicated in block 416. Data mover 24 halts the transfer associated with the read as indicated in block 418.

If an error has not been detected, then a determination is made by data mover 24 as to whether there are additional sectors to read as indicated in block 420. If there are no additional sectors to read, then the method ends. If there are additional sectors to read then the method repeats beginning with the function shown in block 404. If only one sector remains to be read, then data mover 24 provides a last-in-transfer signal to host interface 22 using conductor 64.

In FIG. 4b, data mover 24 provides the transfer block signal to host interface 22 using conductor 62 as indicated in block 434. The transfer block signal causes one or more blocks to be received from host device 12 for writing to data storage device 28. Data mover 24 provides the transfer sector signal to device interface 26 using conductor 76 as indicated in block 436. The transfer sector signal instructs device interface 26 to begin transferring information associated with the write command.

Data mover 24 receives information associated with the write command from host interface 22 using conductors 60 as indicated in block 438. Data mover 24 provides the information to device interface 26 using conductors 70 as indicated in block 440. Data mover 24 receives the sector transferred signal from device interface 26 using conductor 72 as indicated in block 442.

A determination is made by data mover 24 as to whether an error has been detected as indicated in block 444. If an error has been detected, then data mover 24 generates an interrupt associated with the error and provides the interrupt to system module 20 using a conductor 68 as indicated in block 446. Data mover 24 halts the transfer associated with the write as indicated in block 448.

If an error has not been detected, then a determination is made by data mover 24 as to whether there are additional blocks to write as indicated in block 450. If there are no additional blocks to write, then the method ends. If there are additional blocks to write, then the method repeats beginning with the function shown in block 434. If only one sector remains to be written, then data mover 24 provides a last-in-transfer signal to host interface 22 using conductor 64.

Figure 5A:
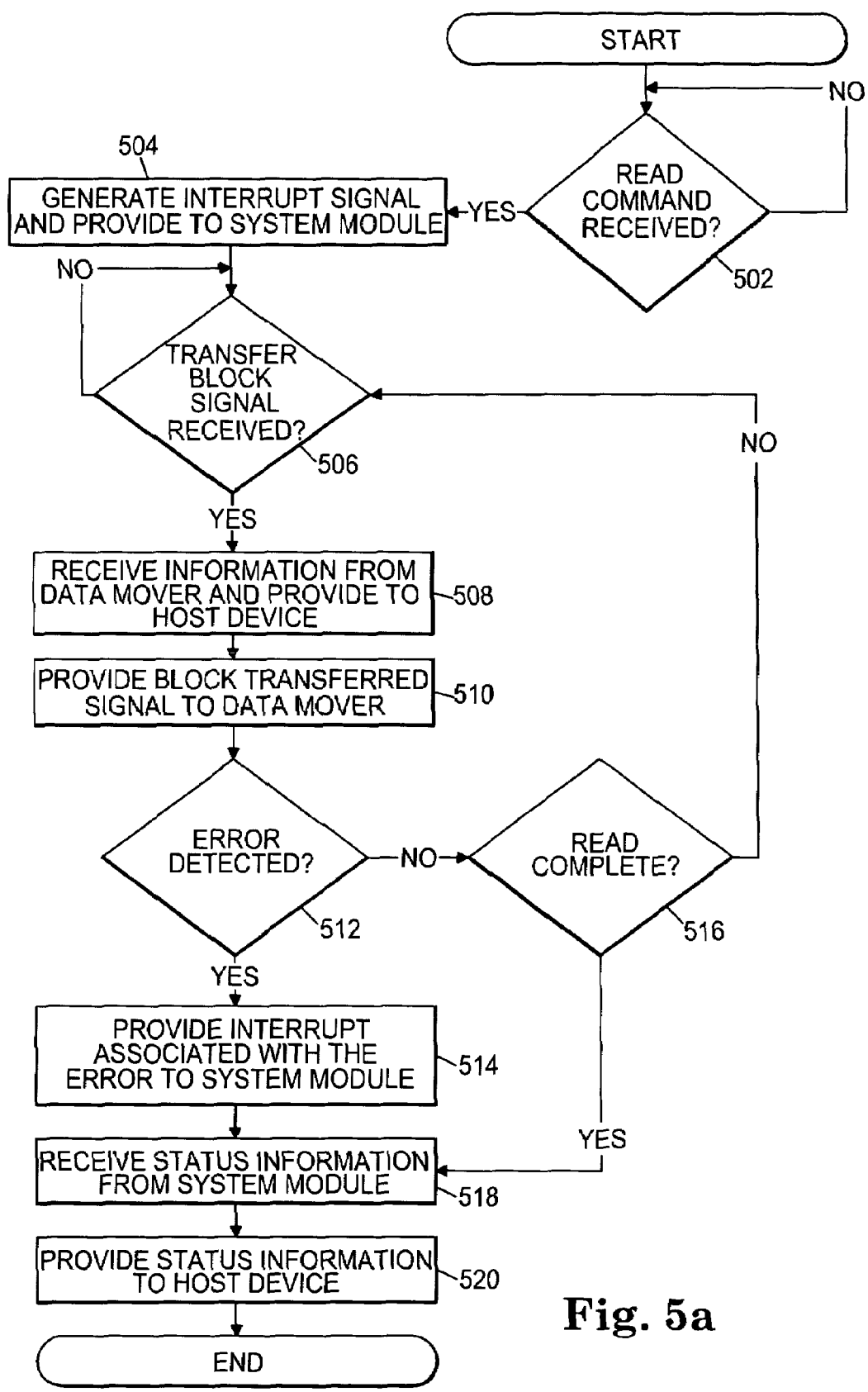
FIG. 5a is a flow chart illustrating an embodiment of a first method performed by a host interface.
Figure 5B:
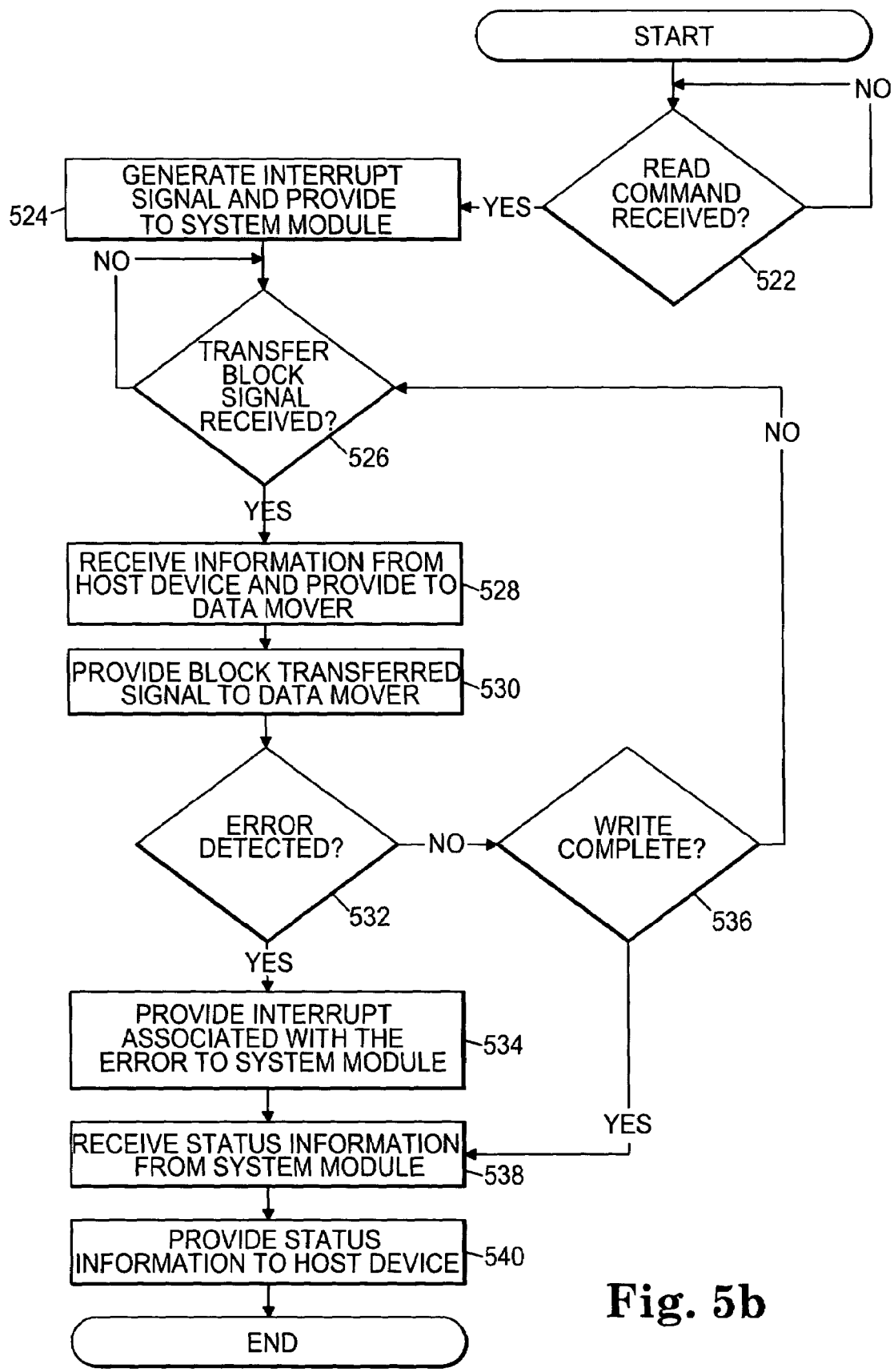
FIG. 5b is a flow chart illustrating an embodiment of a second method performed by a host interface.

FIGS. 5a and 5b are flow charts illustrating embodiments of methods performed by host interface 22 in response to read commands and write commands, respectively.

In FIG. 5a a determination is made by host interface 22 as to whether a read command has been received on conductor 52 as indicated in block 502. If a read command has not been received, then the determination of block 502 is repeated at a later time. If a read command has been received, then host interface 22 generates an interrupt signal associated with the read command and provides the interrupt signal to system module 20 using a conductor 56 as indicated in block 504.

A determination is made by host interface 22 as to whether the transfer block signal has been received on conductor 62 as indicated in block 506. If the transfer block signal has not been received, then the function of block 506 is repeated at a later time. If the transfer block signal has been received then host interface 22 receives information from data mover 24 using conductors 60 and provides the information to host device 12 using conductors 50 as indicated in block 508. Host interface 22 provides the block transferred signal to data mover 24 using conductor 66 as indicated in block 510.

A determination is made by host interface 22 as to whether an error has been detected as indicated in block 512. If an error has been detected, then host interface 22 generates an interrupt associated with the error and provides the interrupt to system module 20 using a conductor 56 as indicated in block 544

If an error has not been detected, a determination is made by host interface 22 as to whether the read has completed as indicated in block 516. Host interface 22 may determine that the read has completed in response to receiving the last-in-transfer signal from data mover 24 on conductor 64. If the read has not completed, then the function of block 506 is repeated.

Subsequent to either an error being detected or the read completing, host interface 22 receives status information from system module 20 as indicated in block 518. Host interface 22 provides the status information to host device 12 as indicated in block 520.

In FIG. 5b, a determination is made as to whether a write command has been received by host interface 22 on conductor 52 as indicated in block 522. If a write command has not been received, then the function of block 522 is repeated at a later time. If a write command has been received, then host interface 22 generates an interrupt signal associated with the write command and provides the interrupt signal to system module 20 using a conductor 56 as indicated in block 524.

A determination is made by host interface 22 as to whether the transfer block signal has been received by host interface 22 on conductor 62 as indicated in block 526. If the transfer block signal has not been received, then the function of block 526 is repeated at a later time. If the transfer block has been received, then host interface 22 receives information associated with the write command from host device 12 using conductors 50 and provides the information to data mover 24 using conductors 60 as indicated in block 528. Host interface 22 provides the block transferred signal to data mover 24 using conductor 66 as indicated in block 530.

A determination is made by host interface 22 as to whether an error has been detected as indicated in block 532. If an error has been detected, then host interface 22 generates an interrupt associated with the error and provides the interrupt to system module 20 using a conductor 56 as indicated in block 534.

If an error has not been detected, a determination is made by host interface 22 as to whether the write has completed as indicated in block 536. Host interface 22 may determine that the write has completed in response to receiving the last-in-transfer signal from data mover 24 on conductor 64. If the write has not completed, then the function of block 526 is repeated.

Subsequent to either an error being detected or the write completing, the host interface 22 receives status information from system module 20 as indicated in block 538. Host interface 22 provides the status information to host device 12 as indicated in block 540.

Figure 6A:
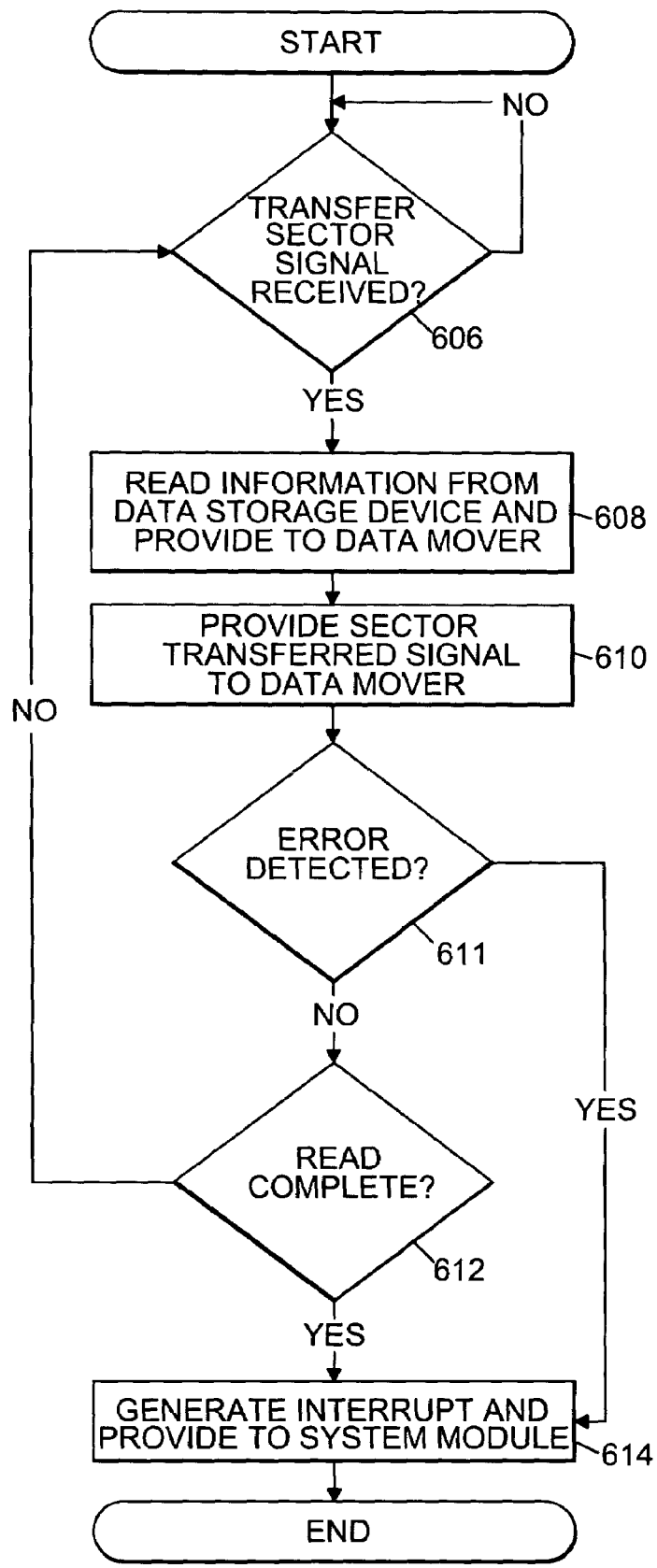
FIG. 6a is a flow chart illustrating an embodiment of a first method performed by a device interface.
Figure 6B:
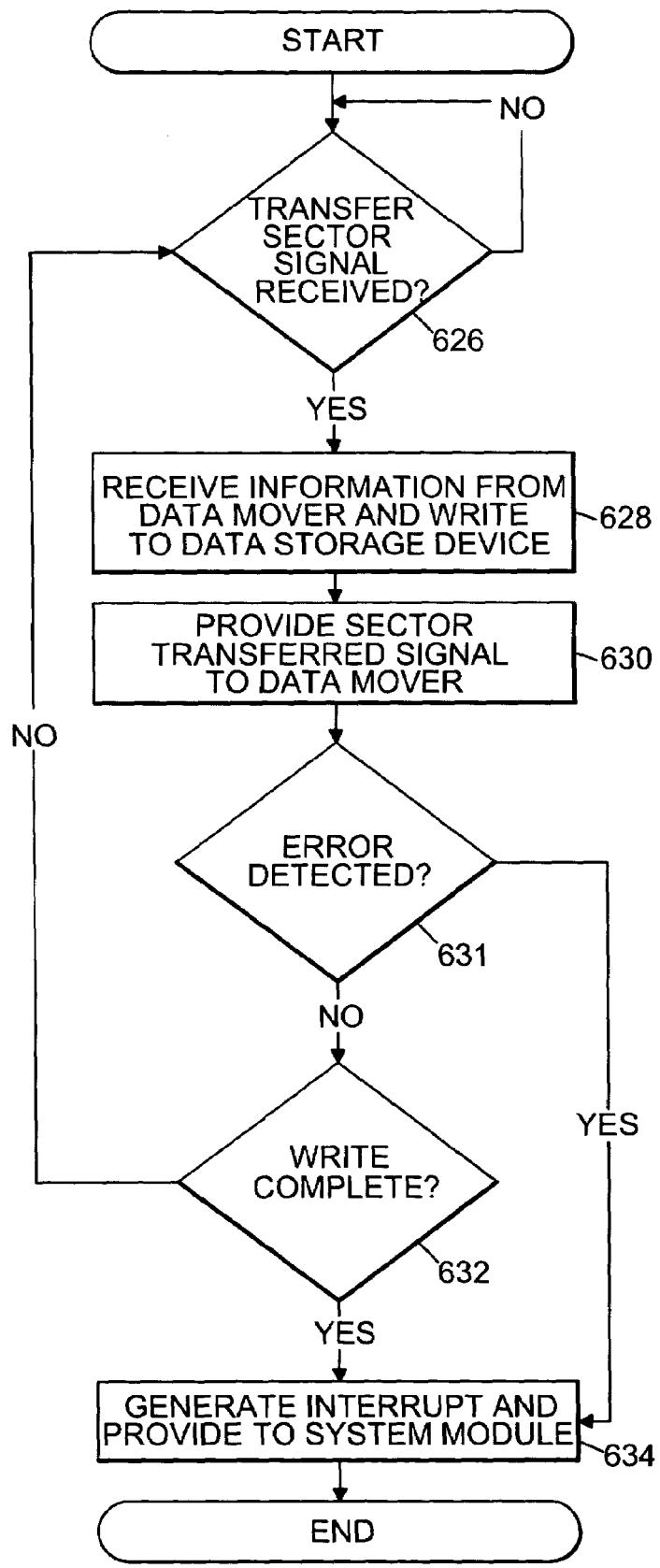
FIG. 6b is a flow chart illustrating an embodiment of a second method performed by a device interface.

FIGS. 6a and 6b are flow charts illustrating embodiments of methods performed by device interface 26 in response to read commands and write commands, respectively.

In FIG. 6a, a determination is made by device interface 26 as to whether the transfer sector signal has been received on conductor 76 as indicated in block 606. If the transfer sector signal has not been received then the function of block 606 is repeated at a later time. If the transfer sector signal has been received, then device interface 26 reads information from data storage device 28 using conductors 80 and provides the information to data mover 24 using conductors 70 as indicated in block 608. Device interface 26 provides a sector transferred signal to data mover 24 using conductor 72 as indicated in block 610.

A determination is made by device interface 26 as to whether an error has been detected as indicated in block 611. If an error has been detected, then an interrupt is generated by device interface 26 and provided to system module 20 using a conductor 78 as indicated in block 614. In this case, the interrupt is an error interrupt that informs system module 20 that device interface 26 has detected an error.

If an error has not been detected, then a determination is made by device interface 26 as to whether the read has completed as indicated in block 612. If the read has not completed, then the function of block 606 is repeated.

If the read has completed, then device interface 26 generates an interrupt and provides the interrupt to system module 20 using a conductor 78 as indicated in block 614. In this case, the interrupt is a command complete interrupt that informs system module 20 that device interface 26 has completed the transfer of information associated with the read command.

In FIG. 6b, a determination is made by device interface 26 as to whether the transfer sector signal has been received on conductor 76 as indicated in block 626. If the transfer sector signal has not been received, then the function of block 626 is repeated at a later time. If the transfer sector signal has been received, then device interface 26 receives information associated with the write from data mover 24 using conductors 70 and writes the information to data storage device 28 using conductors 80 as indicated in block 628. Device interface 26 provides the sector transferred signal to data mover 24 using conductor 72 as indicated in block 630.

A determination is made by device interface 26 as to whether an error has been detected as indicated in block 631. If an error has been detected, then an interrupt is generated by device interface 26 and provided to system module 20 using a conductor 78 as indicated in block 634. In this case, the interrupt is an error interrupt that informs system module 20 that device interface 26 has detected an error.

If an error has not been detected, then a determination is made by device interface 26 as to whether the write has completed as indicated in block 632. If the write has not completed, then the function of block 626 is repeated.

If the write has completed, then device interface 26 generates an interrupt and provides the interrupt to system module 20 using a conductor 78 as indicated in block 634. In this case, the interrupt is a command complete interrupt that informs system module 20 that device interface 26 has completed the transfer of information associated with the write command.

Figure 7:
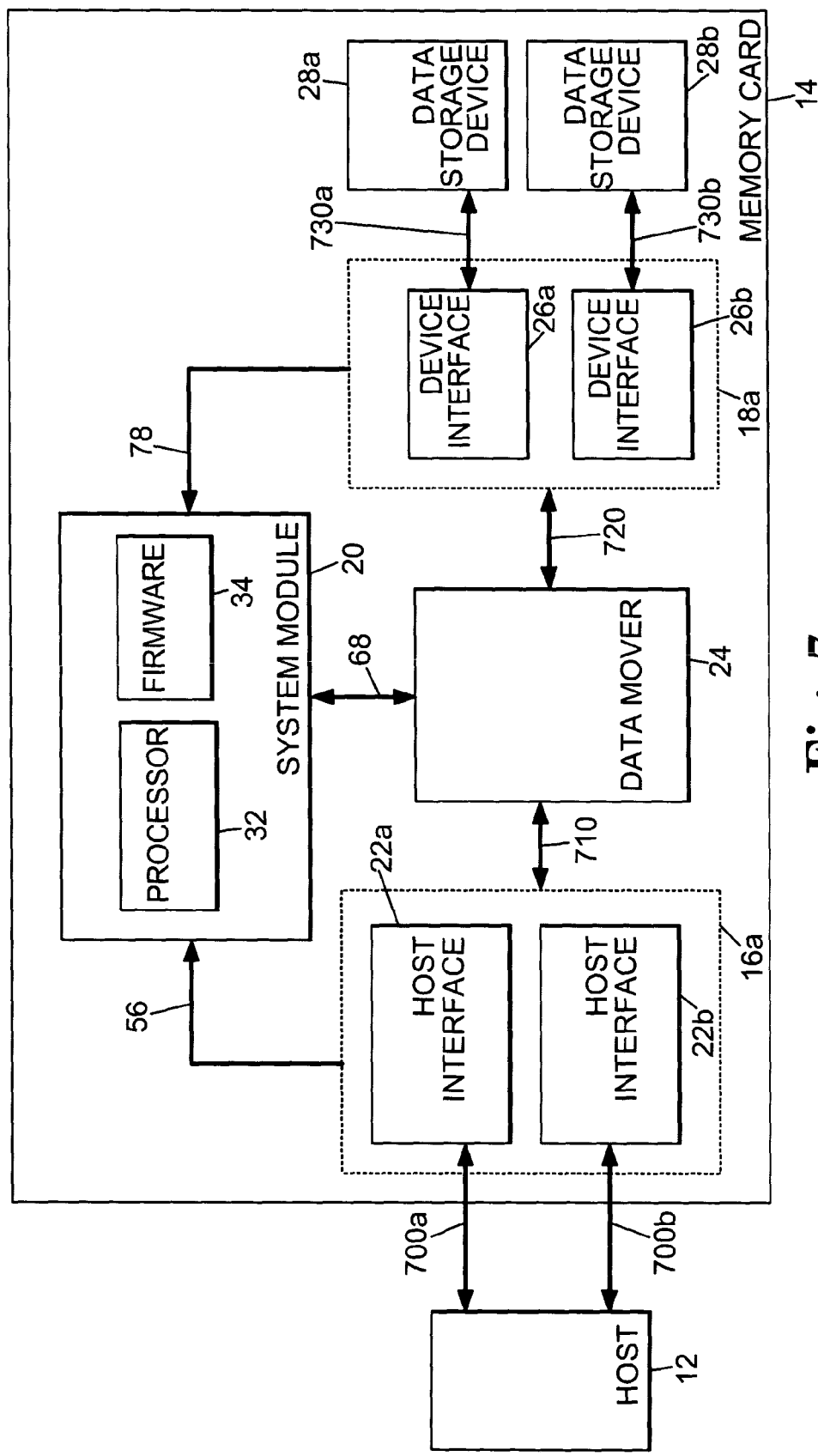
FIG. 7 is a block diagram illustrating an alternative embodiment of a memory card with modular components.

FIG. 7 is a block diagram illustrating an alternative embodiment of memory card 14 with modular components 16a and 18a. In FIG. 7, modular component 16a includes first and second host interfaces 22a and 22b. Modular component 18a includes device interfaces 26a and 26b. Host interfaces 22a and 22b each operate in the same way as host interface 22. Device interfaces 26a and 26b each operate the same way as device interface 26.

Signal conductors 700a and 700b each include the conductors 50 and 52 as shown in FIG. 2. Similarly, signal conductors 710 include the conductors 60, 62, 64, and 66, signal conductors 720 include the conductors 70, 72, 74, and 76, and signal conductors 730a and 730b each include the conductors 80 as shown in FIG. 2.

A control module (not shown) in modular component 16a selectively couples the signals from either host interface 22a or host interface 22b to conductors 56 and conductors 710. A control module (not shown) in modular component 18a selectively couples either device interface 26a or device interface 26b to data mover 24 using conductors 720 and to system module 20 using conductors 78.

As illustrated in FIG. 7, modular components 16a and 18a may each include multiple types of interfaces, e.g. a CompactFlash interface and a Secure Digital interface, and a MRAM storage device interface and a flash storage device interface, respectively. Host device 12 may communicate with memory card 14 using either host interface 22a or host interface 22b.

With device interfaces 26a and 26b, memory card 14 is configured to include two different types of data storage devices 28a and 28b, e.g. an MRAM storage device and a flash memory storage device.

In one embodiment, only one of data storage devices 28a and 28b is present in memory card 14. For example, the least expensive of data storage devices 28a and 28b may be included. In other embodiments, memory card 14 may include both data storage devices 28a and 28b to utilize advantages of different types of storage media.

What is claimed is:

1. A memory card having:
   a first interface, said first interface including a first buffer and a register for storing commands from a host and said first interface is a host interface;
   a second interface, said second interface including a second buffer and said second interface is a device interface; and
   a processor coupled between said first interface and said second interface; and
   a memory storing firmware adapted to be executed by said processor, wherein said firmware includes code providing a generic interface between said host interface and said processor.

2. The invention of claim 1 further including a third buffer disposed between said first interface and said second interface.

3. the invention of claim 2 wherein said third buffer is coupled to said processor.

4. The invention of claim 1 further including a data storage device coupled to said second interface.

5. The invention of claim 1 wherein said first buffer is a first in, first out memory.

6. The invention of claim 1 wherein said second buffer is a first in, first out memory.

7. The invention of claim 1 wherein said firmware includes code for providing a generic interface between said device interface and said processor.

8. A memory card having:
   a host interface including a first buffer and a command register for storing commands from host;
   a device interface including a second buffer,
   a third buffer disposed between said host interface and said device interface;
   a processor coupled between said first, second and third buffers; and
   memory for storing firmware adapted to be executed by said processor, said firmware including code for providing a generic interface between said host and said processor and for providing a generic interface between said device interface and said processor.

9. The invention of claim 8 further including a data storage device coupled to said second interface.

10. The invention of claim 8 wherein said first buffer is a first in, first out memory.

11. The invention of claim 8 wherein said second buffer is a first in, first out memory.

12. A method for providing a versatile memory card including the steps of
   providing a first interface with a first buffer, wherein said first interface is a host interface;
   storing commands from a host in a register in said first interface;
   providing a second interface, said second including a second buffer and said second interface is a device interface;
   coupling a processor between said first interface and said second interface; and
   providing a memory storing firmware adapted to be executed by said processor, said firmware including providing a generic interface between said host interface and said processor and providing a generic interface between said device interface and said processor.

* * * * *

UNITED STATES PATENT AND TRADEMARK OFFICE
CERTIFICATE OF CORRECTION

PATENT NO. : 7,409,477 B2 Page 1 of 1
APPLICATION NO. : 10/654135
DATED : August 5, 2008
INVENTOR(S) : Stewart R. Wyatt et al.

It is certified that error appears in the above-identified patent and that said Letters Patent is hereby corrected as shown below:

In column 1, line 13, delete "flied" and insert -- filed --, therefor.

In column 1, line 15, delete "incorponited" and insert -- incorporated --, therefor.

In column 10, line 8, in Claim 3, delete "the" and insert -- The --, therefor.

In column 10, line 21, in Claim 8, after "from" insert -- a --.

In column 10, line 22, in Claim 8, after "buffer" delete "," and insert -- ; --, therefor.

In column 10, line 29, in Claim 8, after "host" insert -- interface --.

In column 10, line 39, in Claim 12, after "of" insert -- : --.

In column 10, line 44, in Claim 12, after "said second" insert -- interface --.

In column 10, line 50, in Claim 12, after "including" insert -- code --.

Signed and Sealed this

Seventeenth Day of February, 2009

JOHN DOLL
*Acting Director of the United States Patent and Trademark Office*